Figure 1:
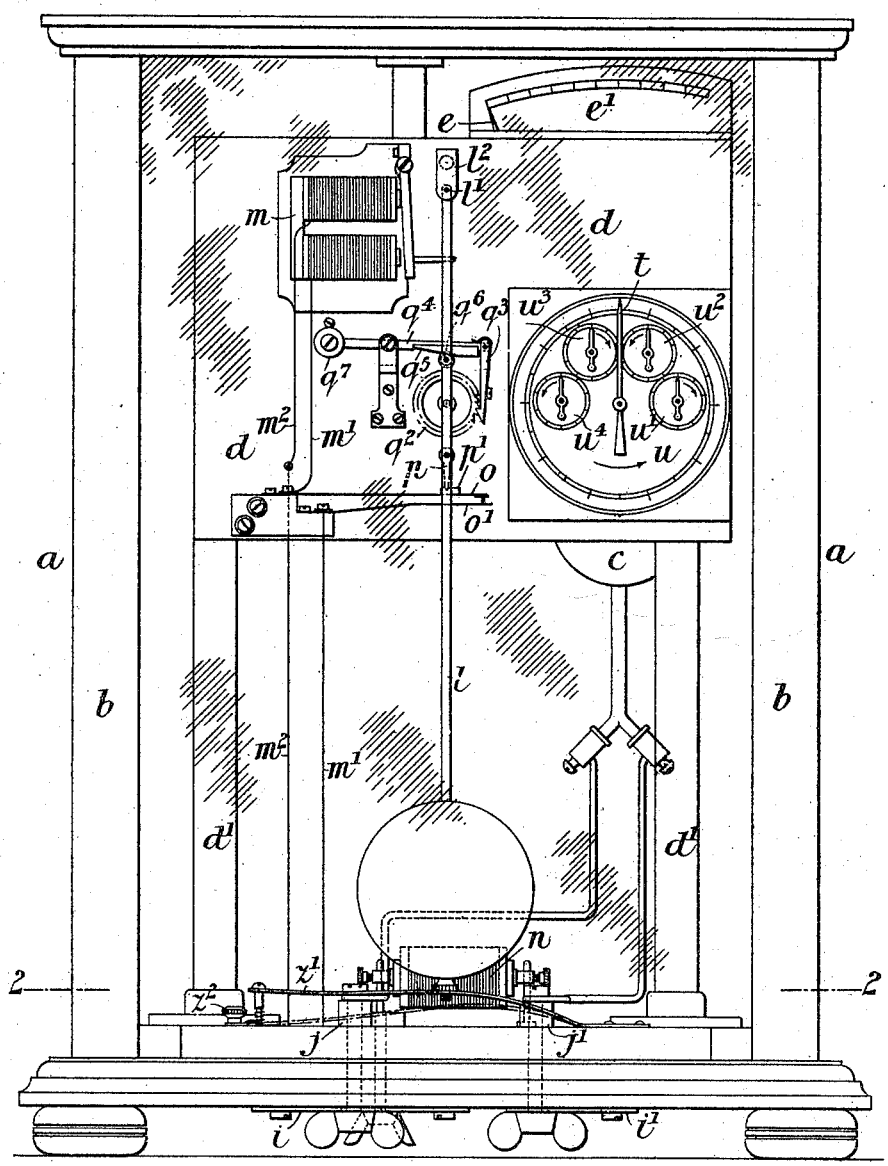

(No Model.) 3 Sheets—Sheet 1.

A. W. STAVELEY, I. H. PARSONS & T. J. MURDAY.
ELECTRICITY METER.

No. 585,892. Patented July 6, 1897.

Witnesses.

Inventors.

(No Model.) 3 Sheets—Sheet 2.

A. W. STAVELEY, I. H. PARSONS & T. J. MURDAY.
ELECTRICITY METER.

No. 585,892. Patented July 6, 1897.

Witnesses
J. D. Kingsbury
G. A. Vauberschmidt

Inventors
Alwyn W. Staveley
Isaac H. Parsons
Thomas John Murday
By Whitaker & Prevost Attys.

(No Model.) 3 Sheets—Sheet 3.
A. W. STAVELEY, I. H. PARSONS & T. J. MURDAY.
ELECTRICITY METER.

No. 585,892. Patented July 6, 1897.

Witnesses.
Inventors

UNITED STATES PATENT OFFICE.

ALWYN WALTER STAVELEY, ISAAC HARDY PARSONS, AND THOMAS JOHN MURDAY, OF LEICESTER, ENGLAND.

ELECTRICITY-METER.

SPECIFICATION forming part of Letters Patent No. 585,892, dated July 6, 1897.

Application filed January 5, 1897. Serial No. 618,025. (No model.)

*To all whom it may concern:*

Be it known that we, ALWYN WALTER STAVELEY, ISAAC HARDY PARSONS, and THOMAS JOHN MURDAY, subjects of the Queen of Great Britain, residing at Leicester, England, have invented new and useful Improvements in Electricity-Meters, of which the following is a specification.

Our invention relates to an improved electricity-meter which we believe will register the quantity of current consumed more accurately than electricity-meters as heretofore constructed and which will at the same time indicate to a consumer the quantity of current which is being consumed at any moment, thereby enabling him to check the consumption of current from time to time.

According to our invention we make use of any ordinary ammeter and we provide for recording at regular intervals the indications of the said ammeter and totaling the results on a series of dials.

In carrying out our invention we make use of a motor driven at a substantially uniform speed by part of the current to be measured—such, for instance, as a pendulum or balance-wheel—and we utilize this motor for rotating an arm coöperating with a lever (hereinafter referred to as the "recording-lever") which actuates through the medium of suitable mechanism—such, for instance, as ratchet mechanism—the first wheel of a recording-train to a greater or less extent according as the free end of the said recording-lever projects more or less into the path of the said rotating arm.

In conjunction with the recording-lever we arrange what we term a "feeler," which under the action of a spring or of gravity normally bears against the index or pointer of the ammeter to regulate the position of the free end of the recording-lever relatively with the rotating arm according to the position of the index of the ammeter. To prevent the contact of this feeler with the index of the ammeter from moving the said index, we provide a clamping or gripping device which normally holds the said index of the ammeter. In connection with the rotating arm which operates the recording-lever we arrange a cam-surface which during the action of the said rotating arm upon the recording-lever (at which time also the feeler is moved away from the index of the ammeter) moves the gripping or clamping device to release the index of the ammeter and allow it to take up a position corresponding to any variation which may have taken place in the quantity of current consumed while the said index was held by the said clamping or gripping device.

To enable our invention to be fully understood, we will describe the same by reference to the accompanying drawings, in which—

Figure 5:
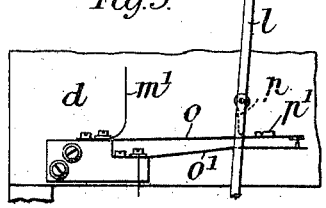
Figure 6:
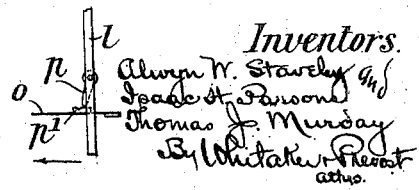
Figure 2:
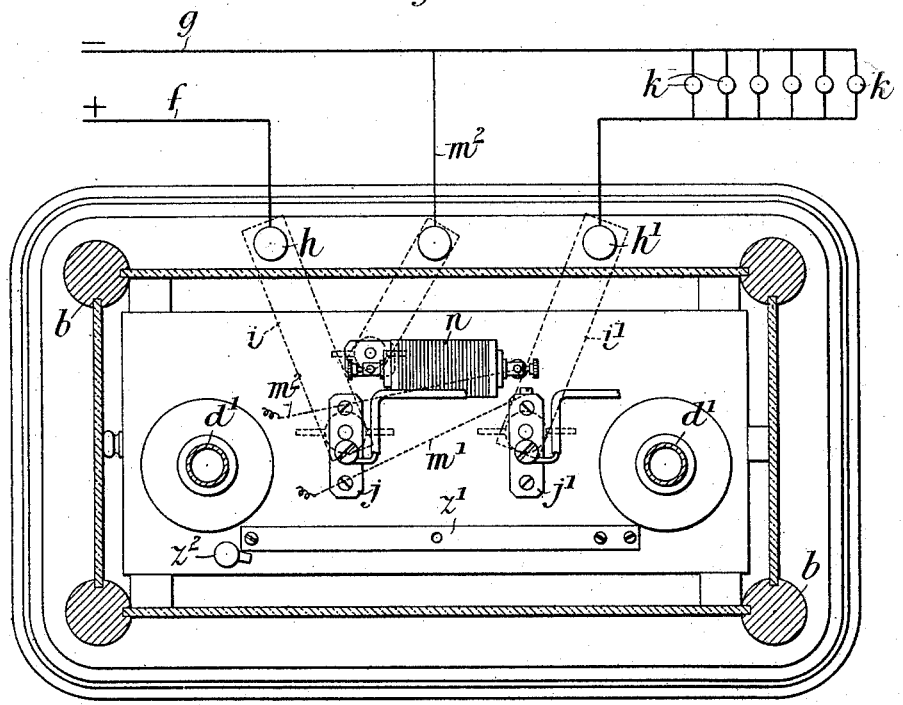
Figure 8:
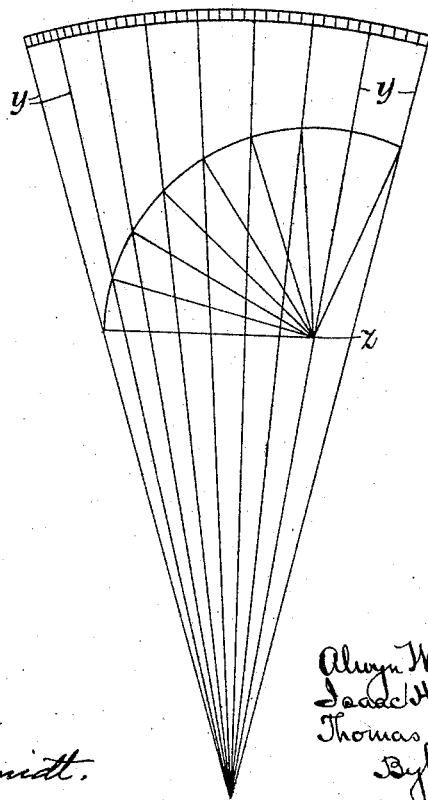
Figure 3:
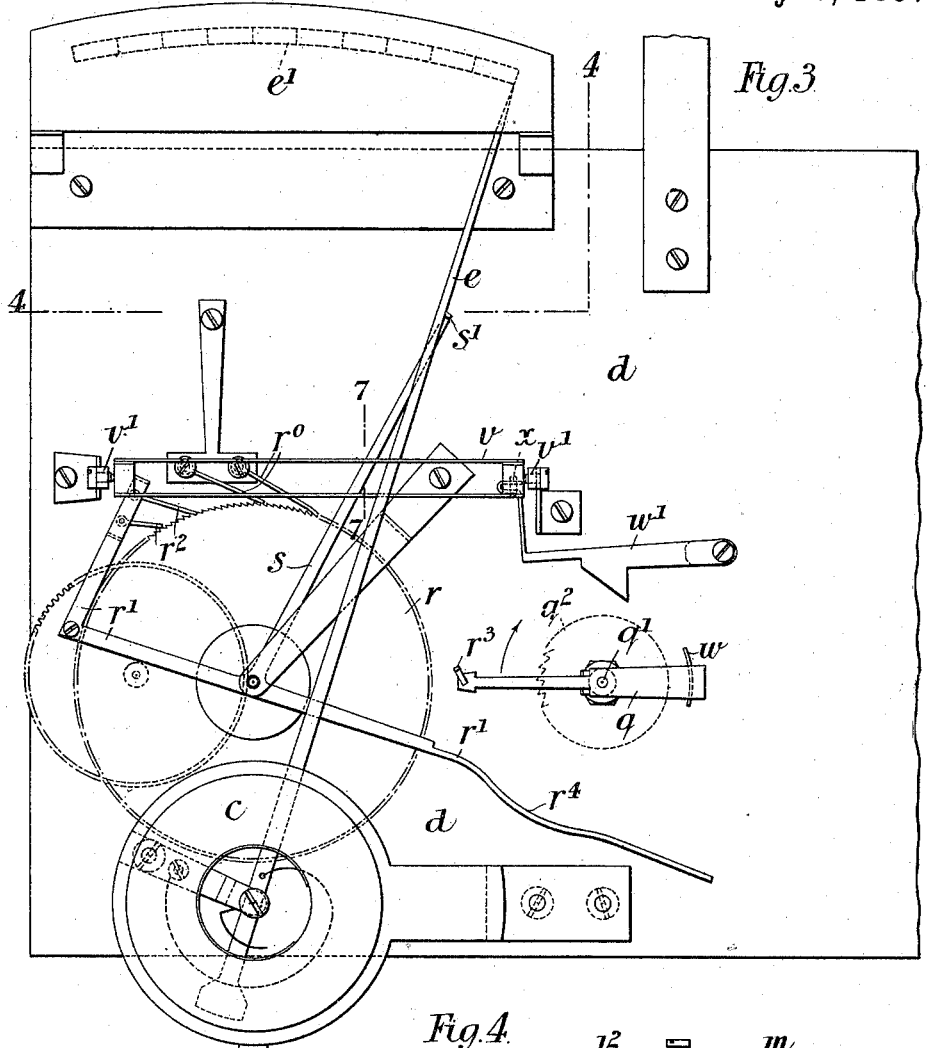
Figure 4:
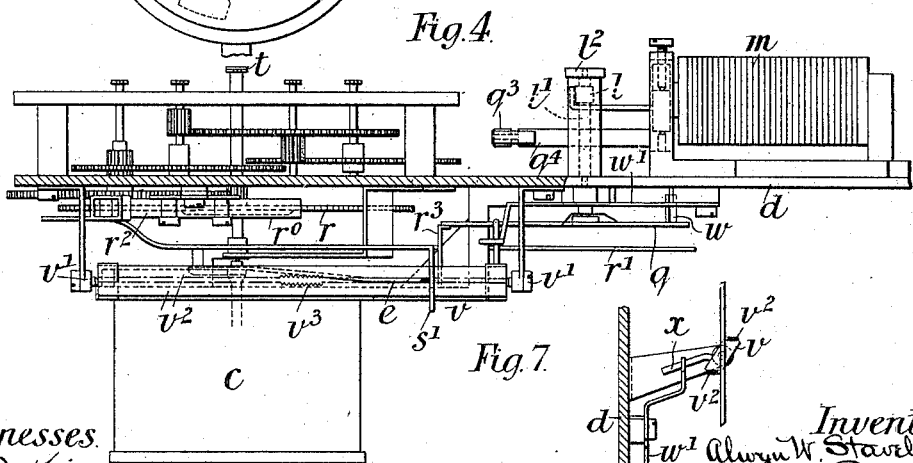
Figure 7:

Figure 1 is a front elevation of our meter; and Fig. 2 is a section on the line 2 2, Fig. 1. Fig. 3 is a rear view, drawn to a larger scale than Fig. 1, of some of the mechanism of our meter; and Fig. 4 is a section on the line 4 4, Fig. 3. Fig. 5 is a view of some of the parts shown in Fig. 1, but in a different position to illustrate their operation; and Fig. 6 shows some of the same parts in another position. Fig. 7 is a section on the line 7 7, Fig. 3. Fig. 8 is a diagram illustrating a modification of our invention.

$a$ is the casing of our meter, which may be of any suitable construction, but which, as shown in the drawings, has corner-pillars $b\, b$, carrying between them sheets of glass.

$c$ is the coil of an ammeter, fixed to a plate $d$, carried upon pillars $d'\, d'$, fixed to the base board or plate of the casing, the index or pointer $e$ of the said ammeter being arranged to work over a scale $e'$, as shown in Figs. 1 and 3.

$f\, g$ are the positive and negative circuit wires or cables, respectively, the former, which includes the coil of the ammeter, being connected to two binding-posts $h\, h'$, which are in communication with the terminals of the ammeter-coil through the conducting strips or plates $i\, i'$ and the terminal-plates $j\, j'$, to which the terminals of the ammeter-coil are directly connected, as shown in Figs. 1 and 2, so that the whole of the current to be measured passes through the meter.

$k\, k$ are lamps arranged in parallel between the conductors.

$l$ is the motor, which, as shown, is a pendulum carried by an arbor $l'$, supported in the plate $d$ and in a bracket $l^2$, fixed thereto, Figs. 1 and 4, and $m$ is the electromagnet for operating the said pendulum, the said magnet receiving its current from the terminal plate $j'$ through the wire $m'$, Figs. 1 and 2, and a contact making and breaking device, the current after passing through the said magnet returning through the wire $m^2$ to the main conductor $g$. In order to protect the said magnet from injury, owing to the passage of an excessive amount of current through it, and also to limit the quantity of current used for operating the pendulum, we arrange between the said magnet and the conductor $g$ a suitable resistance, such as the coil $n$, Figs. 1 and 2.

In order further to economize the quantity of current consumed, the contact making and breaking device which we employ in connection with the electromagnet $m$ is not necessarily operated to close the circuit at each oscillation of the pendulum, but only at such times as the oscillations of the pendulum fall below a certain arc of movement. A suitable contact device for this purpose is shown in Figs. 1 and 5, wherein $o$ $o'$ are two contact-springs in the wire $m'$, which springs are normally separated, as shown in Fig. 5. Upon the rod of the pendulum is pivoted, so as to swing very freely, a pendant or trip-piece $p$, and on the contact-spring $o$ is a block $p'$, notched to receive the end of the said trip-piece, as shown in Fig. 1, the said trip-piece and block being so related to each other as regards length and thickness that when the pendulum is at rest in its vertical position and the end of the trip-piece is upon the block $p'$ the contact-spring $o$ will be depressed into contact with the spring $o'$.

The length of the block $p'$ is such that with a normal arc of oscillation of the pendulum the trip-piece $p$ will pass right over the said block $p'$ without moving the spring $o$, but that when the swing of the pendulum falls below a certain limit the said trip-piece $p$ will not clear the block, as shown in Fig. 6, so that on the return swing of the pendulum in the direction of the arrow, Fig. 6, the said spring will be pressed down in a manner which will be readily understood by reference to Figs. 1 and 6, whereupon the circuit of the magnet $m$ will be completed and will impart a fresh impulse to the pendulum.

The number of oscillations which the pendulum makes without a fresh impulse will be dependent upon the amount of work which the pendulum has to perform, which work will slightly increase in proportion as the amount of current consumed increases. The notch in the block $p'$ serves to insure that when the trip-piece is in contact with the said block it shall not for any reason slide along and off the same without depressing it. With this arrangement we obtain a pendulum doing variable work having practically no timekeeping error beyond the usual temperature error, and we can avoid this small inaccuracy by the use of a compensating pendulum.

$q$ is the arm which is rotated by the pendulum, the said arm being mounted on one end of an arbor $q'$, on the other end of which is a ratchet-wheel $q^2$, with which engages a spring-pawl $q^3$, Figs. 1 and 4, carried by a pivoted arm $q^4$. On the under side of the arm $q^4$ is an inclined cam-surface $q^5$, against which a roller $q^6$, carried by a pin on the pendulum-rod, is designed to operate in order to oscillate the said arm $q^4$ and so move the pawl $q^3$ to operate the ratchet-wheel $q^2$.

$q^7$ is a counterweight fixed on the arm $q^4$ to balance the lever, so as to reduce the amount of energy which the pendulum has to expend in moving the said lever to a minimum.

$r$ is the first wheel of a recording-train of wheels, and $r'$ is the recording-lever hereinbefore referred to, which recording-lever at one end carries a series of pawls $r^2$ $r^2$, engaging with teeth on the periphery of the wheel $r$, two or more pawls being used in order to subdivide the length of a tooth of the ratchet-wheel, whereby very small movements can be imparted to the said wheel $r$ in a manner which will be readily understood. $r^0$ $r^0$ are detent-pawls engaging with the wheel $r$. The other end of the recording-lever $r'$ is designed to be engaged by a pin $r^3$ on the rotating arm $q$ to move it through a greater or less arc according as the lever $r'$ projects more or less across the circular path of the arm $q$.

$s$ is the feeler fixed upon the recording-lever, the said feeler having a bent end $s'$, which normally rests against the index or hand $e$ of the ammeter under the weight of the end of the recording-lever $r'$, carrying the pawls $r^2$.

It is to be understood that when the index or hand of the ammeter is at the zero position, as shown in the drawings, the feeler $s$ will retain the recording-lever $r'$ out of the circular path of the arm $q$, so that as the said arm rotates under the movement of the pendulum no movement will be imparted to the recording-lever. When, however, the hand $e$ moves more or less over the scale $e'$, the feeler $s$ by following up the said hand brings the recording-lever $r$ into the path of the pin $r^3$ of the rotating arm $q$, so that at each rotation of the said arm $q$ the recording-lever $r'$ and consequently also the wheel $r$ will be moved a corresponding distance.

It will be obvious that a proper relation must be established between the several parts in order to obtain proper records. For instance, assume the hand $e$ of the ammeter to be at the first division on the scale, which indicates, say, a current of one ampere passing, and assume also that one rotation of the wheel $r$ corresponds with a current of one ampere passing for one hour and that the arm $q$ is rotated by the pendulum to make one revolution per minute. Then the recording-lever $r'$ must be so arranged relatively with the wheel $r$ and with the arm $q$ that if the wheel $r$ has, say, one hundred and twenty teeth, it will be moved a distance of two teeth at each oscillation of the lever $r'$. If the hand of the ammeter is at the second division of the scale, the movement of the wheel $r$ should be four teeth, and if at the tenth division of the scale twenty teeth.

In practice we find it advantageous to fix in connection with the wheel $r$ a pointer $t$, Fig. 1, moving over a dial $u$, as shown in Fig. 1, one rotation of the pointer $t$ around the said dial $u$ under the above-assumed conditions corresponding to a consumption of current of one ampere for one hour. If a current of ten amperes at an electromotive force of one hundred volts passing for one hour indicates a Board-of-Trade unit, then it will be obvious that the pointer $t$ in recording one unit will move ten times around the dial $u$. A dial $u'$ is advantageously arranged so that one revolution of its pointer indicates one unit of electricity, and other dials $u^2$ $u^3$ $u^4$ may be arranged in a well-known manner for recording tens of units, hundreds of units, and thousands of units.

It will be obvious that with a meter constructed in this manner a consumer can, knowing the quantity of current which a lamp or lamps should consume, readily check the consumption.

$v$ is the clamping or gripping device, which serves to hold the hand $e$ of the ammeter against movement by the contact of the feeler therewith. This gripping device comprises a frame adapted to rotate upon its axis between two pivots or trunnions $v'$ $v'$, Fig. 3, and having two bars $v^2$ $v^2$, notched, as shown in Fig. 4, at $v^3$, between which the hand of the ammeter moves, as shown in Fig. 7. When the said frame is turned to the position shown in Fig. 7, the index or pointer of the ammeter will be held against movement. When, however, the said frame is turned upon its axis to place the bars $v^2$ $v^2$ in a different plane from that shown, then the hand $e$ of the ammeter is free to move under the action of its operating-coil $c$. The movement of this frame is effected by the arm $q$, which carries a cam-surface $w$, which at each rotation of the said arm $q$ acts against a lever $w'$, engaging with an arm $x$ in connection with the said frame. As, as hereinbefore stated, the arm $q$ makes, say, one rotation per minute, it will be obvious that the hand $e$ of the ammeter will be released each minute to allow of the ammeter adjusting itself to any variations which may have taken place in the quantity of current passing during the preceding minute. This release of the hand of the ammeter takes place at the time when the pin $r^3$ is acting against the lever $r'$, whereby the feeler is moved back to its zero position and so cannot impede the free movement of the hand $e$ when adjusting itself. A curved surface $r^4$ is formed in this recording-lever $r'$, which curved surface is concentric with the path of the pin $r^3$ when the said recording-lever is in a position corresponding with the zero position of the index or pointer, whereby the feeler is retained in its zero position for a definite period of time to allow the ammeter hand or pointer time to come to rest and the clamping device to close again to hold the ammeter-hand in its new position before the feeler again comes into contact with it.

In Fig. 3 of the drawings we have represented a meter wherein the ammeter-dial is graduated uniformly—that is to say, wherein equal movements of the hand $e$ correspond with equal variations of current. In this case the axis of the recording-lever $r'$ is represented as being placed vertically above the axis of the hand $e$ of the ammeter, so that equal movements of the ammeter-hand make substantially equal movements of the feeler and consequently also of the recording-lever $r$. It is well known, however, that equal movements of the ammeter-hand do not always correspond with equal variations of current. This will be understood by reference to Fig. 8, wherein the lines $y$ $y$ are lines corresponding with equal variations of current. In order that in this case the unequal movements of the hand may insure equal movements of the feeler, and consequently of the lever $r'$, the axis of the said lever is arranged to one side of the vertical line passing through the axis of the ammeter-hand—for instance, to the point $z$, as shown in Fig. 8.

$z'$ is a spring adapted to engage and hold the lower end of the pendulum for transport purposes, the said spring being disengaged when the meter is in use and held by a turnbuckle $z^2$.

Although the foregoing description refers to the use of an ammeter, it is to be understood that a wattmeter can be applied with equal advantage.

It is also to be understood that instead of using a pendulum as a timekeeping-motor we may use any other motor suitable for the purpose—as, for instance, a balance-wheel, as hereinbefore indicated.

Having now particularly described and ascertained the nature of our said invention and in what manner the same is to be performed, we declare that what we claim is—

1. In an electricity-meter, the combination with the ammeter provided with an indicating-arm, operated thereby, of recording mechanism, an operating-lever for said recording mechanism, provided with an arm or feeler having a portion in the path of said indicating-arm, for regulating the position of said lever, and an actuating device having a uniform movement adapted to engage said lever, substantially as described.

2. In an electricity-meter, the combination with an ammeter provided with an indicating-arm operated thereby, of recording mechanism, an operating-lever for said recording mechanism, provided with an arm or feeler having a portion in the path of said indicating-arm, for regulating the position of said lever, and an actuating device having a uniform movement adapted to engage said lever, substantially as described.

3. In an electricity-meter, the combination with the ammeter provided with an indicating-arm operated thereby, of recording mechanism, an operating-lever for said recording mechanism provided with an arm or feeler having a part in the path of said indicating-arm, an actuating device having a uniform movement adapted to engage said operating-lever, and means for locking said indicating-arm while it is engaged by said feeler, substantially as described.

4. In an electricity-meter the combination with the ammeter provided with an indicating-arm, of recording mechanism, an operating-lever therefor provided with an arm or feeler having a part in the path of said indicating-arm, means for locking said indicating-arm while it is engaged by said feeler, and an actuating device for said lever, provided with means for releasing said locking device, substantially as described.

5. In an electricity-meter, the combination with the ammeter provided with an indicating-arm, of recording mechanism, an operating-lever therefor, having an arm or feeler provided with a part in the path of said indicating-arm, a locking device for said indicating-arm comprising a pair of parallel bars on opposite sides of said arm, adapted to clamp said arm at any position to which it may be moved, and an actuating device for said lever provided with means for releasing said locking device, substantially as described.

6. In an electricity-meter, the combination with the ammeter provided with an indicating-arm, of recording mechanism, an operating-lever therefor having an arm or feeler provided with a part in the path of said indicating-arm, a locking device for said indicating-arm comprising a pivoted frame provided with a pair of longitudinal parallel bars on opposite sides of said indicating-arm, a continuously-rotating actuating device having a part for engaging said operating-lever and a part for swinging said pivoted frame to release said indicating-arm, substantially as described.

7. In an electricity-meter, the combination with an indicating-arm, of a recording mechanism, an operating-lever therefor, having an arm or feeler provided with a part in the path of said indicating-arm, a locking device for said indicating-arm, a continuously-rotating actuating device for engaging said lever, provided with means for releasing said locking device, said lever having a curved portion concentric with the axis of rotation of said actuating device for holding said feeler out of engagement with said indicating-arm, while the locking mechanism is released, substantially as described.

8. In an electricity-meter, the combination with the ammeter, of recording mechanism controlled thereby, and an actuating device for said recording mechanism comprising among its members, a pendulum, an electric magnet for actuating the same, a circuit-controller for said magnet and a device on said pendulum adapted to engage said circuit-controller when the swing of the pendulum becomes reduced, substantially as described.

9. In an electricity-meter, the combination with the ammeter and recording mechanism controlled thereby, of actuating mechanism for said recording mechanism including among its members, a pendulum, an electromagnet for actuating the same, a circuit-closing device and a pivoted pawl on said pendulum adapted to pass over said circuit-closing device normally, and to operate said device when the swing of the pendulum becomes reduced, substantially as described.

10. In an electricity-meter, the combination with the ammeter and recording mechanism controlled thereby, of actuating mechanism for said recording mechanism comprising among its members a pendulum, an electromagnet for actuating the same, a circuit-closing device for said magnet having a movable member provided with projecting portions and a pawl on said pendulum adapted to engage the projecting portions of the circuit-closing member and operate the same, when the swing of the pendulum becomes reduced, substantially as described.

11. In an electricity-meter for recording at regular intervals the indications of an ammeter or wattmeter and totaling the results, an electrically-driven pendulum in combination with a trip contact-piece which only completes the circuit of the operating-electromagnet when the arc of oscillation of the pendulum falls below a certain length, thus insuring correct timekeeping under variable loads, substantially as described.

12. In an electricity-meter wherein an indicating ammeter or wattmeter is employed and wherein a feeler is used for ascertaining the position of the hand or index of the said ammeter, a clamping device for holding the said hand or index of the ammeter against movement by the said feeler the said clamping device being periodically moved to disengage the said hand or index, substantially as, and for the purpose, described.

ALWYN WALTER STAVELEY.
ISAAC HARDY PARSONS.
THOMAS JOHN MURDAY.

Witnesses:
WM. VAUGHAN ICKE,
GEO. WM. COLTMAN.